United States Patent [19]

McCulloch et al.

[11] Patent Number: 5,685,194
[45] Date of Patent: Nov. 11, 1997

[54] DIFFERENTIAL TWIN SENSOR SYSTEM

[75] Inventors: Reginald W. McCulloch, Caryville; Omar Garcia, Oak Ridge, both of Tenn.

[73] Assignee: Delta M Corporation, Oak Ridge, Tenn.

[21] Appl. No.: 507,997

[22] Filed: Jul. 27, 1995

[51] Int. Cl.⁶ .................... G01F 23/00; G01F 1/68
[52] U.S. Cl. ............................. 73/295; 73/204.11
[58] Field of Search ................... 73/295, 204.11, 73/204.14, 204.17, 204.18, 204.24, 204.25; 374/3, 10, 43, 54, 164, 183, 185; 364/557, 571.06

[56] References Cited

U.S. PATENT DOCUMENTS

| | | |
|---|---|---|
| 4,372,691 | 2/1983 | Buckley ........................ 374/44 |
| 4,619,140 | 10/1986 | Kuhnel ........................ 73/295 |
| 4,734,554 | 3/1988 | Tateda et al. ................ 374/10 X |
| 4,825,383 | 4/1989 | Ory . | 
| 4,918,995 | 4/1990 | Pearman et al. ............. 73/204.11 X |
| 4,981,369 | 1/1991 | Kumada et al. ............. 374/10 X |
| 5,031,126 | 7/1991 | McCulloch et al. . |
| 5,083,460 | 1/1992 | Kumada et al. . |
| 5,102,230 | 4/1992 | Kobayashi et al. . |
| 5,111,692 | 5/1992 | McQueen et al. . |
| 5,137,370 | 8/1992 | McCulloch et al. . |
| 5,321,633 | 6/1994 | Kataoka et al. .............. 73/295 X |

Primary Examiner—George M. Dombroske
Assistant Examiner—Paul D. Amrozowicz
Attorney, Agent, or Firm—Luedeka, Neely & Graham, P.C.

[57] ABSTRACT

Differential outputs produced by twin thermoresistive sensors are used to determine the level and flow of a medium. Separate constant current sources supply power to each sensor so that one constant current source supplies sufficient current to cause significant self-heating of the sensor (hot sensor) and the other constant current source supplies relatively little current with insignificant self-heating of its corresponding sensor (cold sensor). Resistive changes in the sensors produced by level and flow changes of the medium produce measurable voltage changes, thereby providing a convenient parameter by which to determine level or flow. Level or flow is determined by dividing the difference in the voltages across the hot and cold sensors by the voltage across the cold sensor.

25 Claims, 3 Drawing Sheets

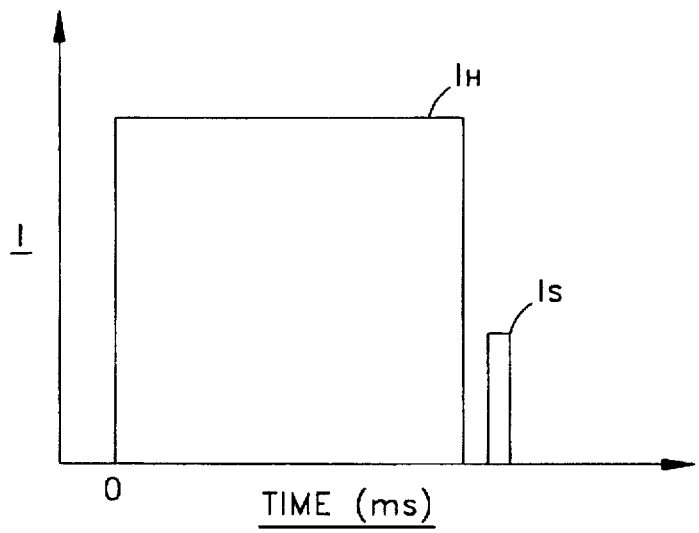
*Fig.* 5
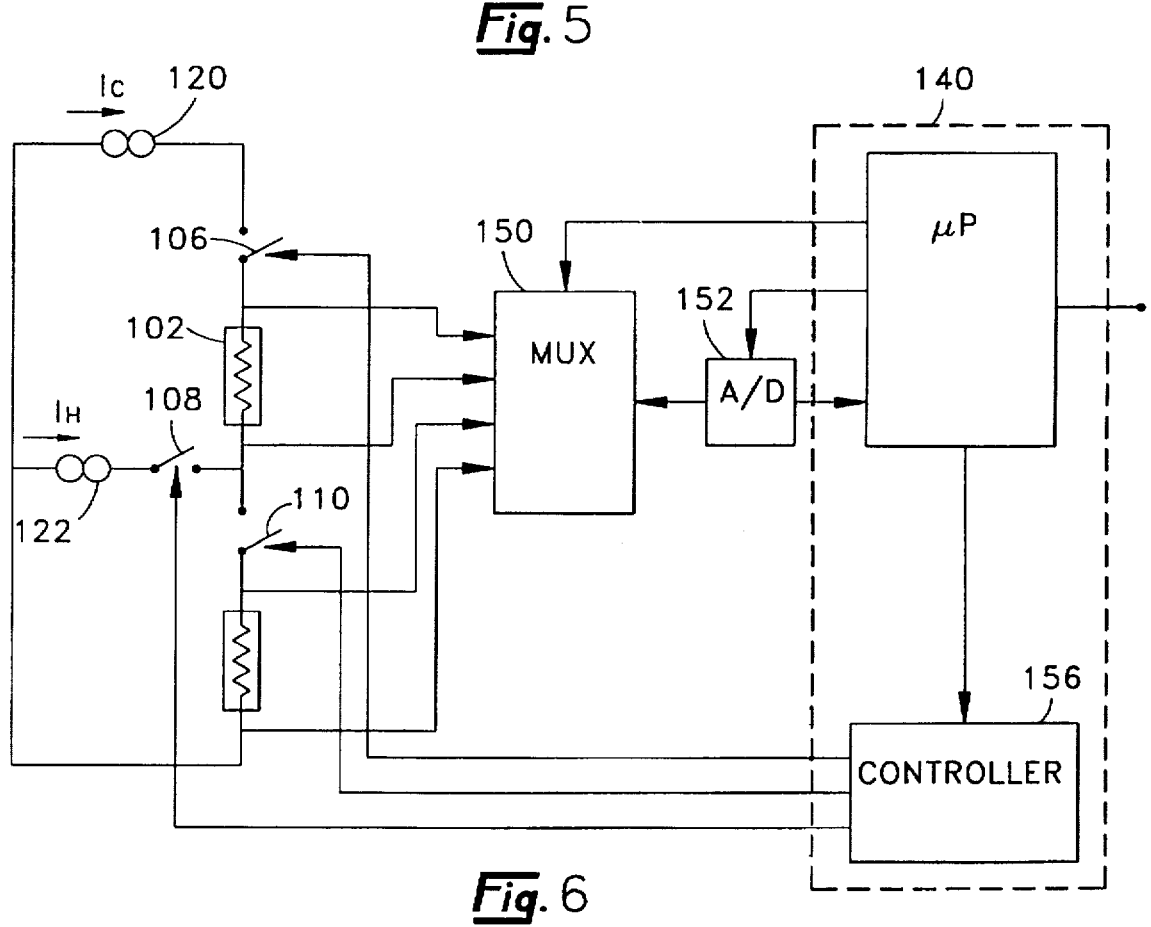
*Fig.* 6

DIFFERENTIAL TWIN SENSOR SYSTEM

TECHNICAL FIELD

The present invention is directed to an apparatus for sensing the level or flow of a medium utilizing twin thermoresistive sensors.

BACKGROUND OF THE INVENTION

Thermoresistive sensors for monitoring the parameters of a medium, such as level or flow, are well known in the art. When a resistive element is heated and submersed in a medium, the resistance of the element can be monitored to determine changed heat transfer conditions around the element. This change is used to determine the flow or level of a medium.

To compensate for errors which can occur as a result of temperature changes of the medium itself, the prior art adds a second sensor element and then mathematically analyzes certain parameters of each sensor element. Generally, a current is supplied to the second sensor which is at a ratio of the current through the first sensor. The voltages across the two sensor elements are mathematically analyzed to produce an output that compensates for thermal changes in the medium. One such prior art method of mathematical analysis uses a constant $I^2R$ (current squared times resistance) calculation and control. Another prior art method uses a constant $I^3R$ (current cubed times resistance) calculation and control. The present invention takes a different approach and measures level or flow based directly on the self-heating coefficient of an ohmic heated thermo-resistive sensor divided by the resistance of the compensating or unheated thermoresistive sensor or $\Delta R/Rc$. Here $\Delta R$ is the difference between the resistance of the self-heated and non-heated compensating sensor.

This $\Delta R/Rc$ ratio can be obtained by supplying a relatively high constant current to heat one sensor and a lower (non-heating) current constant preferably of fixed ratio to the first compensating sensor and measuring the voltage to obtain the necessary information to determine level or flow. The information can be obtained using analog or digital means as well. Additionally, the resistances can be measured using ratiometric means to eliminate errors in the current supplies and provide a higher level of accuracy.

SUMMARY OF THE INVENTION

Regarding the foregoing and other objects of the invention, the present invention provides a thermoresistive sensor circuit for determining a parameter of a medium surrounding one or more sensors. In a preferred embodiment, first and second sensors having resistances which vary with temperature are mounted in the medium at a uniform depth. A first constant current source connected to the first sensor applies a current through the first sensor, thereby producing a first sensor voltage. A second constant current source connected to the second sensor applies a current through the second sensor, producing a second sensor voltage. The second sensor voltage receives an amplification to compensate the currents ratio and the sensors' fabrication tolerances. Subtract means are used to subtract one of the sensor voltages from the other to produce a difference voltage. Divide means are then employed to divide the difference voltage by the second sensor voltage to produce a quotient that corresponds to a parameter of the medium.

Also provided by this invention are first and second current sources that provide constant current to their respective sensors. The first current source provides a sufficient level of current to result in significant self-heating of the first sensor, while the second current source provides a level of current that is lower than that provided by the first current source, resulting in insignificant self-heating of the second sensor.

In a preferred embodiment, this invention provides a thermoresistive sensor circuit for determining a parameter of a medium surrounding one or more sensors. A first sensor having a resistance ($R_1$) which varies with temperature is mounted in the medium. The resistance $R_1$ of this sensor is measured by the equation:

$$R_1 = \frac{R_{01}(1 + \alpha \Delta T_a)}{1 - I_1^2 R_{01} \alpha / A h}$$

where $R_{01}$ represents the non self-heated resistance of said first sensor at 0° C.;

$I_1$ represents the current through said first sensor;

$\alpha$ represents the temperature coefficient of resistance of the sensor;

A represents the surface area of the sensor;

h represents the thermal heat transfer coefficient of the sensor to the fluid media; and $\Delta T_a$ represents the difference between 0° C. and the temperature of the fluid.

A second sensor having a resistance ($R_2$) which varies with temperature is mounted in the medium at a uniform depth with the first sensor. The resistance $R_2$ of this sensor is described by the equation:

$$R_2 = R_{02}(1 + \alpha \Delta T_a)$$

where $R_{02}$ represents the non self-heated resistance of said second sensor at 0° C.

A first current source connected to the first sensor produces a first sensor current ($I_1$) through, and a first sensor voltage ($V_1$) across, the first sensor. Similarly, a second current source connected to the second sensor produces a second sensor current ($I_2$) through, and a second sensor voltage ($V_2$) across, the second sensor. Means for subtracting the second sensor voltage from the first sensor voltage are used to produce a difference voltage ($\Delta V$) as represented by the equation:

$$\Delta V = V_1 - V_2 = (1 + \alpha \Delta T_a)(I_1 R_{01} \gamma_{q1} - I_2 R_{02})$$

where $\gamma_{q1}$ represents a self-heating coefficient for said first sensor.

Finally, means for dividing the difference voltage by the second sensor voltage are used to produce a signal (S) that is representative of a parameter of the medium surrounding the sensors. The signal (S) is given by the equation:

$$S = \frac{\Delta V}{V_2} = \frac{I_1 R_{01} \gamma_{q1}}{I_2 R_{02}} - 1.$$

In one embodiment, an amplifier is also provided for amplifying the second sensor voltage by a gain (G) as given by the equation:

$$G = \frac{I_1 R_{01} \gamma_{q1}}{I_2 R_{02}}.$$

In this embodiment, the amplified voltage ($GV_2$) is substituted for the unamplified voltage so that $\Delta V = V_1 - GV_2$ and $S = \Delta V/GV_2$.

This invention also provides a method for measuring a parameter of a medium by using first and second thermoresistive sensors. This method comprises the steps of mounting the sensors at a uniform depth in a chamber into which the medium enters and applying a first current through and a voltage across the first sensor. This first current is at a sufficient level to cause significant self-heating of the first sensor. Next, a second current is applied through, and a second voltage is applied across, the second sensor. This second current is at a low enough level to cause only insignificant self-heating of the second sensor. One of the first or second voltages is then subtracted from the other to produce a difference voltage. Finally, the difference voltage is divided by the second voltage to produce a signal representative of a parameter of the medium. In one embodiment, the voltage across the second sensor is amplified and the amplified second voltage is substituted for the second voltage in the method described above.

BRIEF DESCRIPTION OF THE DRAWINGS

The preferred embodiment will now be described in further detail with reference to the drawings, wherein like reference characters designate like or similar elements throughout the several drawings, as follows:

FIG. 5 is an illustration of a typical duty cycle for the system of FIG. 4; and

FIG. 6 is a schematic circuit diagram of the digital system of FIG. 4.

DETAILED DESCRIPTION OF THE PREFERRED EMBODIMENT

Figure 1:
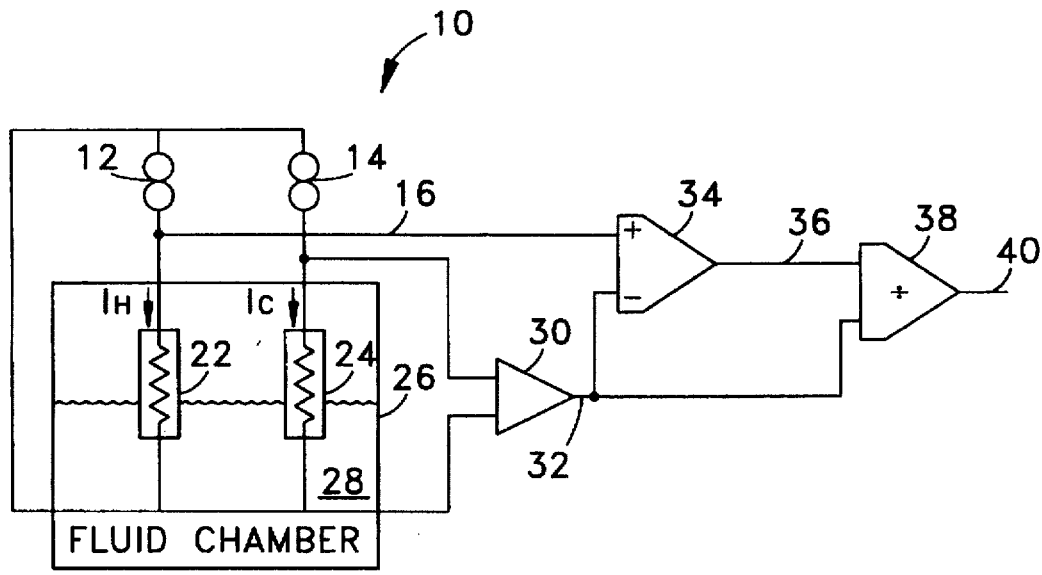
FIG. 1 is a functional circuit diagram for an analog embodiment of the invention that measures level.

In accordance with a preferred embodiment of the present invention as shown in FIG. 1, the hardware configuration for a differential twin sensor system 10 for measuring the level of a medium, such as a fluid 28, is illustrated. Two separate constant current sources 12 and 14 supply power to twin thermoresistive sensors 22 and 24 mounted in a fluid chamber 26. Source 12 applies a current, $I_H$, to a hot sensor 22 at a sufficient level to cause a significant amount of self-heating of the sensor 22 as current $I_H$ passes through the sensor's resistance. Source 14 applies a relatively small current, $I_C$, to a cold sensor 24 so that self-heating of the sensor 24 is insignificant. Typical ranges for $I_H$ would be in the range of 40 to 400 milliamps, and for $I_C$ the range would typically fall within 1 to 10 milliamps. Preferably $I_H$ is at least ten times greater than $I_C$. The sensors 22 and 24 are preferably mounted at a uniform depth, and they are preferably mounted side-by-side, but need not be.

The resistance $R_H$ of the hot sensor 22 can be described by the equation:

$$R_H = \frac{R_{OH}(1 + \alpha \Delta T_a)}{1 - I_H^2 R_{OH} \alpha / Ah} \quad (1)$$

where:

$R_{OH}$ = non self-heated resistance of hot sensor 22 at T=0° C.

$I_H$ = hot sensor 22 current $\alpha$ = temperature coefficient of resistance

A = surface area of hot sensor 22 h = thermal heat transfer coefficient of hot sensor 22.

$\Delta T_a$ = difference between 0° C. and the temperature of the fluid.

The resistance of the cold sensor 24 can be described by the equation:

$$R_C = R_{OC}(1 + \alpha \Delta T_a) \quad (2)$$

where:

$R_{OC}$ = non self-heated cold sensor 24 resistance at T=0° C. Preferably, sensors 22 and 24 are matched so that $R_{OH} = R_{OC}$ and the resistance of sensors 22 and 24 are typically in the range of 5 to 200 ohms.

Self-heating of the hot sensor 22 will be at least partially quenched by the fluid 28 in the fluid chamber 26. As fluid level changes within the chamber 26, the resistance of hot sensor 22 will change accordingly. For example, as fluid level increases, the temperature of the region quenched of hot sensor 22 decreases as does its total resistance ($R_H$). Since the current $I_H$ through the sensor 22 is constant, the voltage $V_H$ across the sensor 22 decreases. If the thermal heat transfer coefficient of the fluid 28 decreases, or if the fluid level decreases, the effects on resistance $R_H$ and voltage $V_H$ will be reversed.

The temperature of the fluid 28 will also affect the quenching effect on the self-heating of the hot sensor 22. However, changes in ambient fluid 28 temperature are compensated for by the non-heated sensor and will have little or no effect on the measurement output signal 40. Compensation for variations in ambient temperature of the fluid 28 is achieved by contrasting a change in resistance of the hot sensor 22 with change in resistance of the cold sensor 24 as further described below.

At this point it should be noted that heat transfer characteristics of the medium change considerably, depending upon whether the parameter being measured is level or flow. For level applications, the thermal heat transfer coefficient (h) is usually constant. As the level increases, the heated sensor is quenched in the region with which the liquid comes in contact. The size of the sensor 22 and 24 also depends upon which parameter is being measured, level or flow. The preferred liquid level sensor used in level applications is an elongated sensor, usually between 6" to 20' long.

For flow applications, it is h that changes to cause the sensor resistances $R_H$ and $R_C$ to change. Preferred flow sensors 82 and 84 (FIG. 3) sensors are normally small (point) sensors and the liquid (or gas) is in contact with the entire sensor at all times.

Referring again to FIG. 1, the voltage across the cold sensor 24 is applied to an amplifier 30 having a gain (G). A signal representing the voltage difference between the two sensors ($\Delta V$) is obtained by the following equation:

$$\Delta V = V_H - GV_C \quad (3)$$

where:

$V_H$=hot sensor voltage $V_C$=cold sensor voltage.

In the preferred embodiment the amplifier 30 gain is set to produce a zero difference in voltage between the hot sensor 22 and the cold sensor 24 when the fluid level being measured is empty. (Although the preferred embodiment uses a value of zero to represent an empty condition, it will be understood that any value may be used, so long as the amplifier gain is set to produce a known value at a known condition.) In other words, when there is an empty condition, the amplified, cold sensor voltage 32 being output by the amplifier 30 will equal the unamplified voltage 16 from the hot sensor 22. To obtain the zero voltage difference under these conditions, the amplifier 30 gain (G) is determined by:

$$G = \frac{I_H R_{OH} \gamma_{q1}}{I_C R_{OC}}. \tag{4}$$

where:

$I_C$=cold sensor 24 current $\gamma_{q1}$=self-heating coefficient when the fluid level is zero (empty)

Self-heating coefficient $\gamma_q$ is determined by:

$$\gamma_{q1} = \frac{1}{1 - I_H^2 R_{OH} \alpha / A h_1} \tag{5}$$

where:

$\alpha$=temperature coefficient of resistance

A=surface area of hot sensor 22

$h_1$=thermal heat transfer coefficient of hot sensor 22 when the vessel is empty When the vessel is full and the gain is set by equation (4), the amplified voltage 32 from the cold sensor 24 is applied to one input of a differential amplifier 34, and the unamplified voltage 16 from the hot sensor 22 is applied to the other input of the differential amplifier to produce a voltage difference ($\Delta V$) which now becomes:

$$\Delta V = I_H R_{OH} (1 + \alpha \Delta T_a)(\gamma_{q2} - \gamma_{q1}). \tag{6}$$

where:

$\alpha$=temperature coefficient of resistance $T_a$ =difference between 0° C. and the temperature of the fluid.

$\gamma_{q2}$=self-heating coefficient when the hot sensor is immersed in liquid Equation (6) describes the total changes in voltage, $\Delta V$, from empty to full conditions. As the level increases from l=0 to l=L, the hot sensor region in contact with the fluid locally changes from a self-heating coefficient of $\gamma_{q1}$ to $\gamma_{q2}$. In general $$\Delta V = I_H R_{OH} (1 + \alpha \Delta T_a)(\gamma_{q2} - \gamma_{q1}) \, l/L \tag{7}$$

Dividing equation (7) by $GV_C$ results in a signal that is independent of temperature and represents only the ohmic heating resistance of the self-heated sensor.

With continued reference to FIG. 1, a voltage divider 38 divides the differential output 36 of differential amplifier 34 by the amplified voltage 32 from the cold sensor 24 to produce a divider output signal (S) 40 representative of level, as shown by the following equation:

$$S = \frac{\Delta V}{GV_C} = (\gamma_{q2}/\gamma_{q1} - 1) \, l/L. \tag{8}$$

The divider output signal 40 is proportional to the amount of fluid that is in contact with the sensors 22 and 24 and varies substantially linearly with level due to the quenching effect as previously described. Additionally, the output signal 40 is substantially unaffected by variations in ambient temperature of the medium being detected. Then, the output signal 40 is an accurate measure of the level of the medium.

Figure 2:
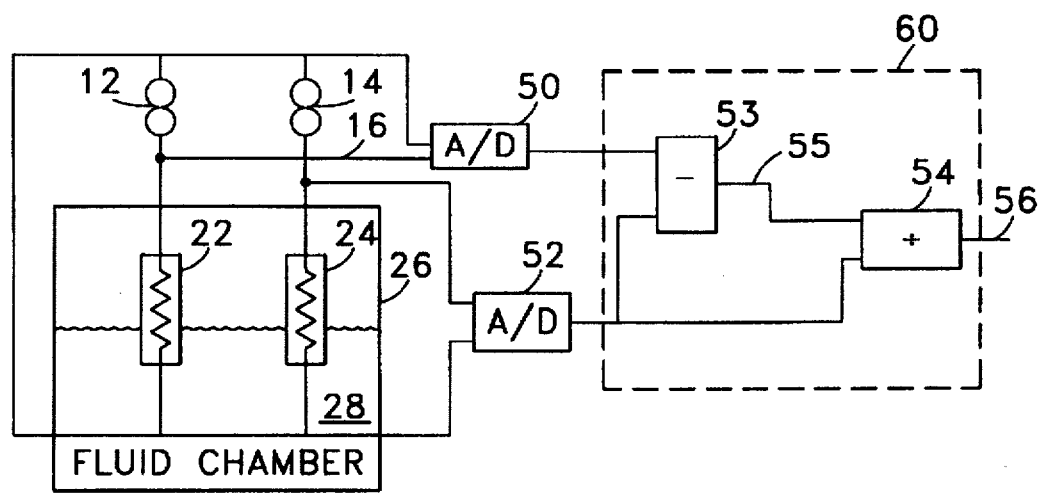
FIG. 2 is a functional circuit diagram for a digital embodiment of the invention that measures level.

Although FIG. 1 illustrates an analog embodiment, it will be understood by those skilled in the art that digital electronics may also be used. For example, digital electronics, such as a/d converters and a computer, may be used to implement amplifier 30, differential amplifier 34 and divider 38. FIG. 2 represents a digital embodiment of the invention, and it implements a different measurement scheme than the embodiment of FIG. 1, but the underlying concepts are consistent. In the embodiment of FIG. 2, digitization of the hot sensor voltage, $V_H$, is accomplished by analog-to-digital converter 50, and digitization of the cold sensor voltage, $V_C$, is accomplished by analog-to-digital converter 52. The digitized voltages of each sensor 22 and 24 are then input to a digital subtractor 53 where a digital version of the sensor voltage difference $\Delta V$ is produced. In this embodiment, the amplifier 30 of FIG. 1 has been eliminated. Thus, it is noted that the $\Delta V$ discussed in reference to FIG. 2 is different from the $\Delta V$ discussed in reference to FIG. 1. Referring to FIG. 2 this voltage difference, $\Delta V$ (appearing on line 55), and the digitized cold sensor voltage, $V_C$, are input to a digital divider 54 that divides $\Delta V$ by $V_C$ to produce a digitized output signal 56 representative of level. Digital subtractor 53 and divider 54 may preferably be implemented as part of a computer 60.

With continued reference to FIG. 2, it is again noted that the cold sensor amplifier 30 shown in FIG. 1 is eliminated and $\Delta V$ is determined by:

$$\Delta V = V_H - V_C. \tag{9}$$

Using $\gamma_q$ of equation (5) in equation (1) gives:

$$R_H = R_{OH}(1 + \alpha \Delta T_a)\gamma_q \tag{10}$$

So $\Delta V$ now becomes:

$$\Delta V = (1 + \alpha \Delta T_a)(I_H R_{OH} \gamma_q - I_C R_{OC}). \tag{11}$$

The output signal 56 is:

$$S = \frac{\Delta V}{V_C} = \frac{I_H R_{OH} \gamma_q}{I_C R_{OC}} - 1. \tag{12}$$

Referring to equations (10) and (2), $\gamma_q$ is seen as their ratio:

$$\gamma_q = \frac{R_H R_{OC}}{R_C R_{OH}}. \tag{13}$$

Substituting for $\gamma_q$ in equation (12) gives:

$$S = \frac{V_H}{V_C} - 1 \tag{14}$$

In operation, the level of fluid 28 is dropped to zero and $S_{EMPTY}$ is physically determined using equation (14). Likewise $S_{FULL}$ may be determined by filling chamber 26 and physically measuring $V_H$ and $V_C$. Once $S_{EMPTY}$ and $S_{FULL}$ are known, equation (14) will define a linear relationship between $S_{EMPTY}$ and $S_{FULL}$, and computer 60 uses S to determine level between empty and full. If desired, the physical dimensions of chamber 26 may be used by the computer 60 to calculate and output level in absolute terms, such as gallons or cubic meters.

Equation (14) is effective even when the fluid 28 or other medium is comprised of two liquids having two different densities. For example, suppose that the sensors 22 and 24 span a region that could have either of two liquid media in contact with their surfaces such that medium 1 ($M_1$) is the top medium (lower density medium) and medium 2 ($M_2$) is the bottom medium (higher density medium). When $M_1$ only is in contact with the sensors, the level (l) of $M_2$ may be characterized as zero. Thus, for $M_1$ only in contact with the sensors (l=0, empty):

$$S_{M1}=V_{HM1}/V_{CM1}-1 \tag{15}$$

where:

$S_{M1}$ represents output signal 56 for $M_1$ only in contact with the sensors.

For $M_2$ only in contact with the sensors (l=L, full):

$$S_{M2}=V_{HM2}/V_{CM2}-1 \tag{16}$$

where:

$S_{M2}$ represents output signal 56 for $M_2$ only in contact with the sensors.

For any other condition where $M_1$ and $M_2$ are both contacting portions of the probe (l=0 to L):

$$S(l)=(V_H/V_C)(l)-1 \tag{17}$$

where:

l represents the level of $M_2$ and the interface between $M_1$ and $M_2$.

When a digital means for analyzing the signal to indicate level or flow is available and the end values (S for l=0 and l=L, or Flow=min and Flow=max) are obtained and stored, a further simplification of the data reduction process, called a normalized sensor response (NSR) is defined. For the above case of interface level measurement the NSR is defined as:

$$\begin{aligned} NSR &= (S_{M1}-S(l))/(S_{M1}-S_{M2}) \\ &= (V_{HM1}/V_{CM1})-(V_H/V_C(l))/(V_{HM1}/V_{CM1})-(V_{HM2}/V_{CM2}) \end{aligned} \tag{18}$$

Defining, $$N_1=(V_{HM1}/V_{CM1}), \tag{19}$$

$$N_2=(V_{HM2}/V_{CM2}), \text{ and} \tag{20}$$

$$N(l)=(V_H/V_C)(l), \tag{21}$$

where:

$M_1$ represents media one covering the sensors or interface level=0, $M_2$ represents media two covering the sensors or l=L, and where $N_1$ and $N_2$ represent the ratio of $V_H/V_C$ at those two conditions.

This yields:

$$NSR=(N_1-N(l))/(N_1-N_2). \tag{22}$$

Equation (22) results in a value between 0 and 1 which is linear with level from l=0 to l=L. Further, it is independent of sensor reference resistance as well as hot and cold sensor current. All that is necessary is to measure and store the ratio of the hot sensor 22 voltages at "empty" and "full" conditions.

Figure 3:
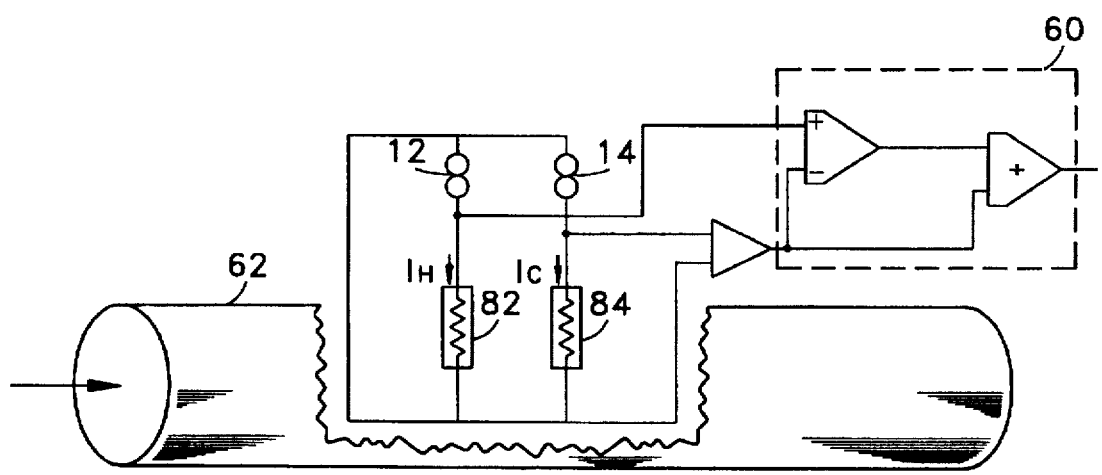
FIG. 3 is a functional circuit diagram for an analog embodiment of the invention that measures flow.

This reasoning applies equally well to flow metering, as illustrated in FIG. 3. Here, twin thermoresistive sensors 82 and 84 draw differential currents $I_H$ and $I_C$ from constant current sources 12 and 14 as previously described for FIG. 1; the primary differences being that instead of positioning the sensors 82 and 84 within a fluid chamber 26 (FIG. 1), the sensors 82 and 84 are positioned within a flow conduit 62, and the sensors 82 and 84 are much smaller as previously discussed. In this case, l=0 corresponds to no or minimum flow and l=L corresponds to maximum flow. For flow, the signal is not linear but can be described by a polynomial or a piecewise linear curve fit routine. This is easily accomplished with a PC driven data acquisition system. The signal is then available for a wide range of uses. Alternatively, N is measured at a number of flow conditions between zero or minimum flow and a maximum flow, and a curve is fitted to the measured points. The curve is then used to calculate flow based on a measured N.

A further application for this thermoresistive sensor system 10 is the measurement of variation in media properties through changes in the heat transfer coefficient, h. Heat transfer coefficient changes can occur as a result of contamination of the medium with a second medium.

An example is the measurement of the water content of a hydrocarbon liquid. In this case the geometry of the sensors is similar to that of flow sensors (FIG. 3). They are contained within a semi-isolated chamber that restricts flow to a value insensitive to the sensors while maintaining communication of the fluid in the chamber to that in the conduit.

The calibration end points at which the $V_H/V_C$ ratio is measured are 100 percent hydrocarbon liquid (zero water) and 100 percent water (or a value at which further water introduced to the hydrocarbon liquid does not change the sensor response). In operation, as the water/oil emulsion passes through the conduit and is introduced to the chamber, the sensor response produces an NSR that varies from zero when no water is present to 1 when the hydrocarbon liquid is saturated with water. The response with increasing water content is not linear so it is necessary to measure the response at several oil/water percentages and develop a calibration curve of NSR vs percent water content in the hydrocarbon liquid.

This general method is applicable to a wide range of fluid mixtures where percent of mixture produces changes in h. In most cases the sensors must be calibrated at a range of mixtures to develop an NSR vs percent mixture calibration curve.

Figure 4:
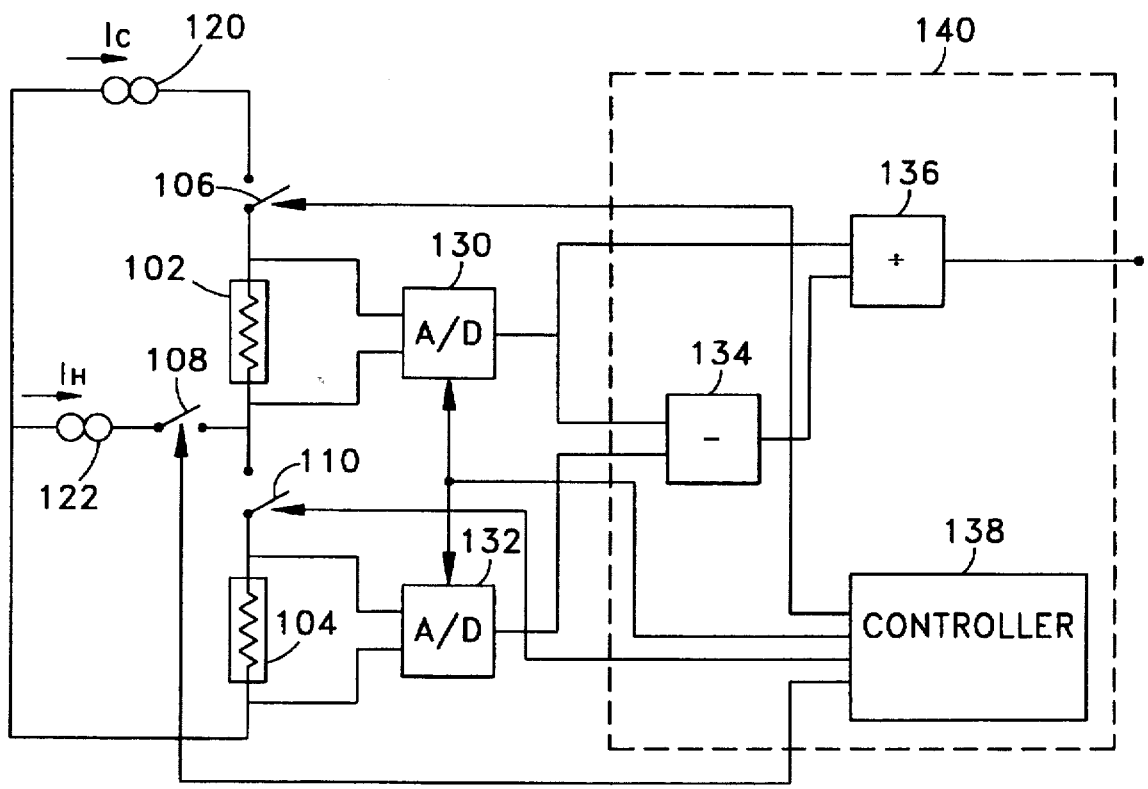
FIG. 4 is a functional diagram of a digital embodiment of the invention that measures either level or flow.

FIG. 4 illustrates a digital based data processing system which uses ratiometric means to obtain hot and cold sensor resistance. The sensors 102 and 104 can be level or flow sensors physically located in a fluid chamber 26 as in FIGS. 1 and 2 or in a flow conduit 62 as in FIG. 3. Also, a digital subtractor 134 and divider 136 are implemented as part of a computer 140, as in FIGS. 2 & 3, except here a controller 138 is employed to control the operation of switches 106, 108, and 110 and A/D convertors 130 and 132.

A typical duty cycle is shown in FIG. 5. Current from constant current source 122 flows through hot sensor 104 with resistance $R_H$ for most of the cycle (50% to 95%) when switches 108 and 110 are closed. $I_H$ is sufficient to cause ohmic self-heating of resistance $R_H$ as previously described. For a short time $I_H$ is turned off and current $I_S$ ($I_{Sensing}$) from constant current source 120 is applied to both sensors in series, thereby producing a voltage representing the non-heated resistance $R_C$ for sensor 102 and the heated resistance $R_H$ for sensor 104. During this time the A/D converters 130 and 132 read the voltages across sensors 104 and 102 as $V_H$ and $V_C$, respectively. The sensing time is very short with respect to the time constant of the sensors so that $R_H$ does not vary appreciably from the value obtained when $I_H$ is passed through it.

Since $I_S$ is common to both measurements, dividing $V_H$ by $V_C$ is equivalent (gives the same ratio) as dividing $R_H$ by $R_C$. Thus, $I_S$ does not need to be known precisely and variations in it between actual measurements of voltage and current across and through the sensors 104 and 102 do not result in level or flow measurement errors. The NSR is calculated and used in the same way as previously discussed except that now, the $V_H/V_C$ ratio is identical to the $R_H/R_C$ ratio.

FIG. 6 illustrates a functionally equivalent embodiment of the invention as shown in FIG. 4, except voltages $V_H$ and $V_C$ across respective sensors 104 and 102 are provided to a single A/D converter 152 by means of 2 to 1 multiplexor 150. Digitized voltages $V_H$ and $V_C$ are received by microprocessor 154 of computer 140. The microprocessor 154 performs subtraction and division of voltages $V_H$ and $V_C$ as previously described. Switching controller 156 is employed to control the operation of the switches 106, 108, and 110.

It is contemplated, and will be apparent to those skilled in the art from the preceding description and accompanying drawings that modifications and/or changes may be made in the embodiments of the invention. Accordingly, it is expressly intended that the foregoing description and accompanying drawings are illustrative of preferred embodiments only, not limiting thereto, and that the true spirit and scope of the present invention be determined by reference to the appended claims.

What is claimed is:

1. A thermoresistive sensor circuit for determining a parameter of a medium surrounding one or more sensors, comprising:

a first sensor mounted in the medium, said first sensor having a resistance which varies with temperature;

a second sensor mounted in the medium at a uniform depth with said first sensor, said second sensor having a resistance which varies with temperature;

a first current source connected to said first sensor and applying a current ($I_1$) through said first sensor, producing a first resistance $R_H$ and a first sensor voltage $V_H$;

a second current source connected to said second sensor and applying a current ($I_2$) through said second sensor, producing a second resistance $R_C$ and second sensor voltage $V_C$, said current ($I_2$) being low enough to produce minimal self-heating of the second sensor;

subtract means for subtracting one of said sensor voltages from the other, producing a difference voltage; and divide means for dividing said difference voltage by said second sensor voltage to produce a ratio that corresponds to a parameter of a medium;

wherein said ratio is proportional to the difference between said first and second resistances $R_H$ and $R_C$ divided by the second resistance $R_C$.

2. The sensor circuit of claim 1 wherein said first and second current sources provide constant current.

3. The sensor circuit of claim 1 wherein said first current source provides a sufficient level of current to result in self-heating of said first sensor.

4. The sensor circuit of claim 3 wherein said second current source provides a current level lower than that provided by said first current source, resulting in a level of self-heating of said second sensor that is lower than the level of self-heating of said first sensor.

5. The sensor circuit of claim 1 further comprising an amplifier for amplifying the second sensor voltage producing an amplified second sensor voltage, said amplifier having a gain represented by the equation:

$$G = \frac{I_1 R_{01} \gamma_{q1}}{I_2 R_{02}}$$

where $I_1$ represents the current through said first sensor;

$I_2$ represents the current through said second sensor;

$R_{01}$ represents the non self-heated resistance of said first sensor at an initial temperature;

$R_{02}$ represents the non self-heated resistance of said second sensor at an initial temperature; and $\gamma_{q1}$ represents a self-heating coefficient for said first sensor in one of the media or at one of the conditions;

wherein said subtract means subtracts the amplified second sensor voltage from the first sensor voltage to produce a difference voltage, said divide means dividing the difference voltage by the amplified second sensor voltage to produce said ratio.

6. The sensor circuit of claim 5 wherein said gain (G) produces a quotient voltage ($\Delta V$) that is zero, when said parameter is zero.

7. The sensor circuit of claim 1 wherein the medium is a liquid.

8. The sensor circuit of claim 1 wherein the medium is a combination of a liquid and a gas.

9. The sensor circuit of claim 1 wherein said subtract means and divide means further comprise a computer.

10. The sensor circuit of claim 1 wherein said parameter is level.

11. The sensor circuit of claim 1 wherein said parameter is flow.

12. The sensor circuit of claim 11 wherein the medium is a gas.

13. A thermoresistive sensor circuit for determining a parameter of a medium surrounding one or more sensors, comprising:

a first sensor mounted in the medium, said first sensor having a resistance ($R_1$) which varies with temperature, including temperature resulting from self-heating, said resistance being described by the equation:

$$R_1 = \frac{R_{01}(1 + \alpha \Delta T_a)}{1 - I_1^2 R_{01} \alpha / Ah}$$

where $R_{01}$ equals the non self-heated resistance of said first sensor at an initial temperature;

$I_1$ equals the current through said first sensor;

$\alpha$ equals the temperature coefficient of resistance of the sensor;

A equals the surface area of the sensor;

h equals the thermal heat transfer coefficient of the sensor; and $\Delta T_a$ equals the difference between 0° C. and the temperature of the fluid;

a second sensor mounted in the medium at a uniform depth with said first sensor, said second sensor having a resistance ($R_2$) which varies with temperature, including temperature resulting from self-heating, said resistance being described by the equation:

$$R_2 = R_{02}(1 + \alpha \Delta T_a)$$

where
$R_{02}$ equals the non self-heated resistance of said second sensor at an initial temperature;

a first current source connected to said first sensor for producing a first sensor current ($I_1$) through, and a first sensor voltage ($V_1$) across, said first sensor;

a second current source connected to said second sensor for producing a second sensor current ($I_2$) through, and a second sensor voltage ($V_2$) across, said second sensor;

means for subtracting said second sensor voltage from said first sensor voltage to produce a difference voltage ($\Delta V$) given by the equation:

$$\Delta V = V_1 - V_2 = (1 + \alpha \Delta T_a)(I_1 R_{01} \gamma_{q1} - I_2 R_{02})$$

where
$\gamma_{q1} = (1 - I_1^2 R_{01} \alpha / Ah)^{-1}$; and
means for dividing said difference voltage by said second sensor voltage producing a signal (S) representative of a parameter of the medium surrounding the sensors, said signal being given by the equation:

$$S = \frac{\Delta V}{V_2} = \frac{I_1 R_{01} \gamma_{q1}}{I_2 R_{02}} - 1.$$

14. The thermoresistive sensor circuit of claim 13, further comprising means for normalizing said signal (S) to produce a normalized sensor response (NSR) that varies in value between 0 and 1 in direct proportion to variances in said parameter as said parameter varies between a minimum and a maximum;

wherein said normalized sensor response (NSR) is given by the equation:

$$NSR = \frac{(V_1/V_2)_{MIN} - (V_1/V_2) f(l)}{(V_1/V_2)_{MIN} - (V_1/V_2)_{MAX}}$$

where
$(V_1/V_2)_{MIN}$ equals the ratio of $V_1$ to $V_2$ when said parameter is at a minimum;
$(V_1/V_2)_{MAX}$ equals the ratio of $V_1$ to $V_2$ when said parameter is at a maximum; and
$(V_1/V_2)$ f(l) equals the ratio of $V_1$ to $V_2$ as said parameter varies between the maximum and minimum, inclusive.

15. The thermoresistive sensor circuit of claim 13 wherein said first and second current sources provide constant current.

16. The thermoresistive sensor circuit of claim 13 further comprising an amplifier for amplifying the second sensor voltage by a gain (G) as given by the equation:

$$G = \frac{I_1 R_{01} \gamma_{q1}}{I_2 R_{02}}.$$

17. A method for measuring a parameter of a first medium using two thermoresistive sensors comprising a first sensor and a second sensor, said method comprising the steps of:

mounting the thermoresistive sensors at a uniform depth in a chamber into which the first medium enters;

applying a first current through the first sensor, said first current being high enough to produce significant self-heating of said first sensor, resulting in a heated resistance $R_H$;

applying a second current through the second sensor, said second current being low enough to produce insignificant self-heating of said second sensor, resulting in a non-self-heated resistance $R_C$;

subtracting either of said first or second resistances $R_H$ or $R_C$ from the other to produce a difference resistance $\Delta R$; and dividing said difference resistance $\Delta R$ by said non-heated resistance $R_C$ to produce a ratio representative of a parameter of the first medium.

18. The method of claim 17 wherein said ratio is further defined by subtracting either of said first or second voltages from the other to produce a difference voltage $\Delta V$, and dividing said difference voltage $\Delta V$ by said second voltage $V_C$ to produce said ratio.

19. The method of claim 18 further comprising the steps of:

amplifying the second voltage $V_C$ by an amplifier gain; and calibrating the amplifier gain so that the difference voltage $\Delta V$ has a known value when said parameter has a known value.

20. The method of claim 17 wherein said parameter is level.

21. The method of claim 17 wherein said, chamber further comprises a flow conduit.

22. The method of claim 21 wherein said parameter is flow.

23. The method of claim 17 wherein said parameter is contamination by a second medium, the method further comprising the steps of:

amplifying the second voltage $V_C$ by an amplifier gain; and calibrating the amplifier gain so that said ratio is representative of the extent of second medium contamination.

24. A thermoresistive sensor circuit for determining a parameter of a medium surrounding one or more sensors, comprising:

a first sensor mounted in the medium, said first sensor having a resistance ($R_1$) which varies with temperature;

a second sensor mounted in the medium at a uniform depth with said first sensor, said second sensor having a resistance ($R_2$) which varies with temperature;

a first source connected to said first sensor and applying a current ($I_1$) through said first sensor, producing a first sensor voltage;

a second source connected to said second sensor and applying a current ($I_2$) through said second sensor, producing a second sensor voltage, said current ($I_2$) being low enough to produce minimal self-heating of the second sensor;

difference means for producing a difference signal corresponding to the difference between the resistance ($R_1$) of the first sensor and the resistance ($R_2$) of the second sensor while each sensor is disposed in said medium; and quotient means for producing a quotient signal corresponding to the difference signal divided by a signal corresponding to the resistance ($R_2$) of said second sensor while disposed in said medium, said quotient signal corresponding to a parameter of the medium.

25. The sensor circuit of claim 24 wherein said second current source provides a current level lower than that provided by said first current source, resulting in a level of self-heating of said second sensor that is lower than the level of self-heating of said first sensor.

* * * * *